Patented Apr. 26, 1938

2,115,017

UNITED STATES PATENT OFFICE 2,115,017

WATERPROOFING COMPOSITION AND METHOD OF PREPARING THE SAME

John Herman Gardthausen, Long Island City, N. Y., assignor to Drigard Products Corporation, New York, N. Y., a corporation of Delaware No Drawing. Application August 14, 1935, Serial No. 36,145. Renewed July 15, 1937

34 Claims. (Cl. 134—11)

My invention relates to a waterproofing composition of matter, and more particularly to a penetrative thin liquid composition having superior waterproofing characteristics, and its method of manufacture.

The present application is a continuation in part of my application Serial No. 747,887, filed October 11, 1934. In that application, the allowed claims of which have been transferred to the present application, there is disclosed a waterproofing composition comprising approximately 3% aluminum stearate, 4% hydrogenated fish oil, 92% light hydrocarbon distillates, e. g., xylene and "Varsol" (defined hereinafter) and 1% alcoholic dispersing agent selected from the lower alcohols of the aliphatic series, e. g., ethyl alcohol; the preferred method of preparation being as follows: The xylene and aluminum stearate are mixed and heated, with agitation, to about 180° F. at which temperature they form a heavy transparent gel or gelatinous mass. To this gel is added the ethyl alcohol which with agitation effects a dispersion of the gel into a thin transparent colloidal mobile liquid. The hydrogenated fish oil in flake or granular form is then added to the thin liquid in which it readily dissolves, and finally the "Varsol" is added. The resulting composition is substantially colorless and transparent and may be utilized for waterproofing various materials, such as stone, brick, leather, fabric and paper without deleteriously affecting the color or other natural properties of any of these materials but rendering them water-repellent throughout their useful life. Due to the thin fluid character of this waterproofing composition, it may be easily applied to the materials to be treated by any of the commonly used methods such as brushing, spraying or immersing.

For purposes of identification of the "Varsol" referred to herein, some of its published characteristics are as follows: "Varsol" is a volatile petroleum distillate having a gravity of at least 45° A. P. I., Saybolt color of 22, low sulphur of about .05%, non-corrosive, and showing no color reaction of contacting with sodium plumbite and sulphur. This distillate, on redistilling, should be at least 55% volatile at 350° F. and 95% volatile at 392° F. with a final end point of not over 410° F.

It is to be understood, however, that any other light hydrocarbon solvent may be used in place of the above mentioned "Varsol".

The present invention constitutes further developments along the lines of my prior application, supra, and is based upon the broad discovery, resulting from numerous laboratory and practical tests, that effective waterproofing compositions possessing many desirable and valuable characteristics may be produced in the following manner: One or more water insoluble soaps are properly associated with one or more saturated or partially saturated natural of synthetical fatty acid glycerides, which are solid or semi-solid at room temperature, employing a hydrocarbon solvent or mixture of such solvents as a suspension medium for these associated materials, and using an alcoholic dispersing agent to reduce the composition to thin penetrative liquid form suitable for various applications.

The saturated or partially saturated glycerides, supra, may be those occurring in natural fats, such as lard made from hog fat, tallow, and other similar natural fatty materials of a solid or nearly solid consistency, which are composed principally of compounds of fatty acids and glycerol. Spermaceti, which is an animal wax, may be used instead of the natural fat saturated glycerides. Likewise, stearin, which is one of the glyceride constituents of natural fats, may be used alone as the fatty material. In addition to the natural fats there is a large class of synthetic fats, produced by hydrogenation of fixed oils, that I have found eminently suitable for combining with the other ingredients mentioned hereinbefore to produce my superior waterproofing composition. By fixed oils I mean the non-volatile oils. Similarly to the natural fats, these fixed oils contain compounds of fatty acids and glycerol, commonly termed glycerides. In their natural form, however, these oils are of a liquid nature, and as such are not as desirable or effective for use in my waterproofing composition as the solid or nearly solid fatty substances. The oils do not dry as quickly as the synthetic or natural fats, they cannot be as easily introduced into the waterproofing composition, and are not, per se, as efficient waterproofing materials as the solid fats.

It is a known inherent characteristic of these fixed oils that they contain a substantial quantity of unsaturated fatty acid glycerides, the latter being of a liquid consistency, and that these glycerides may be converted into the solid or semisolid saturated fatty acid glycerides by the well-known hydrogenation processes. The solid or semi-solid hydrogenated fatty material thus produced may then be combined with the water insoluble soap, solvent and dispersing agent to produce my liquid waterproofing composition of matter.

As suggested above, the natural as well as the hydrogenated fats are both composed principally of saturated and partially saturated fatty acid glycerides, and it is the presence of these substances and their coaction with the other ingredients that I believe are largely responsible for the superior characteristics of my composition. I have found that in addition to the chemical differences involved, the differences in physical characteristics of the oils and fats account to some extent for the superiority of the latter for producing compositions suitable for general waterproofing purposes. These differences may be illustrated by a specific reference to menhaden fish oil and the fat produced by its hydrogenation. If such oil, in its natural liquid form, is combined with a water insoluble soap, e. g., aluminum stearate, a hydrocarbon solvent, and an alcoholic dispersing agent, the process for which is described more in detail hereinafter, the resulting composition will, of course, possess certain waterproofing properties, but at the same time will possess certain undesirable characteristics. Among the undesirable characteristics is the hygroscopic nature of the composition. If, for example, this composition is applied to the exposed outer surface of a building, it will take several weeks to dry and become entirely effective for resisting water. It tends to form small emulsion-like globules with water and is, therefore, subject to being removed from the treated surface by heavy rains and the like. Moreover, this composition possesses a distinctly oily characteristic and the undesirable fish oil odor, both of which limit its general applications. For example, this composition would not be suitable for waterproofing numerous paper and fabric articles.

In contrast to the above, if the waterproofing composition is made up in the same manner, except that a solid or semi-solid natural fat or hydrogenated fat, such as the fat produced by hydrogenating menhaden fish oil, is used instead of the oil, the results produced are entirely different and the above-mentioned disadvantages do not occur. The fat is more easily handled, does not possess any undesirable odor and is practically colorless, so that for these reasons alone it may be used for treating various materials for which the natural oil would not be satisfactory, in addition to the fact that the saturated or partially saturated fat, per se, possesses inherent substantially superior waterproofing characteristics to the unsaturated oil. The fat is not hygroscopic in nature and the resulting composition, instead of forming oily globules, deposits in the form of a substantially colorless, thin, tightly adherent film, which is highly water resistant. As suggested, all of these desirable results can be produced if a natural or synthetical fatty material of a solid or semi-solid nature and consisting principally of the saturated or partially saturated fatty glycerides is used.

The improved waterproofing composition of my present invention, in all of its alternative forms, possesses many advantages over the prior art compositions. In brief, the prior art compositions are of a thick coat-forming nature and contain in most cases substantial amounts of gums, resins, etc., which, due to their inherent characteristics, form upon drying very brittle coatings. These coatings are subject to fracture or complete destruction by handling and ordinary abrasive actions. Once they are broken, of course, their waterproofing effectiveness is lost. In view of the fact that the composition of my present invention does not form any thick surface coating, but in contrast thereto deeply penetrates the pores of the treated material, it is not subject to the limitations and practical disadvantages of the above-mentioned prior art compositions. I have applied the composition of my invention, in a great number of its alternative forms, to various materials and have exposed the treated materials to forced tests and excessive conditions without any substantial loss of their waterproof properties.

An object of my invention is to provide a substantially transparent liquid waterproofing composition that penetrates and tightly adheres to the material to which it is applied without forming any noticeable coating thereon, that does not discolor the treated material and does not lose its waterproofing properties when exposed to even unusually severe atmospheric conditions.

The composition characteristic of my invention, which I have prepared in numerous forms and applied to various materials with satisfactory results, consists generically of at least one water insoluble fatty acid soap, a solid or semi-solid fatty material consisting predominantly of the glycerides of saturated or nearly saturated fatty acids, at least one hydrocarbon solvent, and an alcoholic dispersing agent selected preferably from the lower aliphatic alcohols. I have discovered that when materials of this type are combined in the proper manner and proportions there is a definite coaction between the several ingredients resulting in a new composition of matter suitable for various waterproofing applications. This composition possesses unusual and unexpected water-repellent properties and may be produced in a number of alternative forms.

In preparing this composition I prefer to select my ingredients from the list of hydrogenated oils, natural fats, water insoluble soaps, solvents, and dispersing agents given below.

Hydrogenated oils

Hydrogenated menhaden oil
Do whale oil
Do sardine oil
Do cod oil
Do cod liver oil
Do porgy oil
Do sperm oil
Do corn oil
Do cotton seed oil
Do soya bean oil
Do cocoa-nut oil
Do peanut oil
Do almond oil
Do rape oil
Do castor oil
Do sesame oil
Do olive oil
Do linseed oil
Do tung oil

*Natural fats*
- Lard
- Tallow

*Water insoluble soaps*
- Aluminum stearate
- Copper stearate
- Zinc stearate
- Calcium stearate
- Aluminum oleate
- Aluminum palmitate
- Zinc oleate
- Zinc palmitate

*Solvents*
- Xylene
- Varsol (defined hereinabove)
- Hydrogenated naphtha (e. g. Solvesso) defined hereinafter

*Alcoholic dispersing agents*
- Ethyl alcohol
- Methyl alcohol
- Denatured ethyl alcohol
- Amyl alcohol
- Butylic alcohol In preparing my waterproofing composition in its preferred forms, I have found it necessary to use only one of the above-mentioned alcoholic dispersing agents and solvents and only one of either the hydrogenated oils or natural fats. It is to be understood, however, that whenever necessary or desirable, both the hydrogenated oils and natural fats might be used in the same composition, and in general that two or more of each or all of the above classes of ingredients might be used in preparing the waterproofing composition.

Concerning the hydrogenated oils and natural fats, I have found that for most purposes it is advantageous to use the former. Furthermore, among the hydrogenated oils, I have found that those derived from fish and other marine animals possess of themselves superior waterproofing characteristics to the other oils. This does not mean, of course, that the natural fats and other hydrogenated oils will not work satisfactorily, for I have obtained very good results using natural lard and the hydrogenated vegetable oils, such as, for example, hydrogenated cotton seed oil and hydrogenated corn oil.

Perhaps the best results were obtained when using hydrogenated fish oils, and while I do not wish to be limited to any special theory in connection with my invention, I believe that the presence of the saturated fatty acid glycerides containing relatively high carbon and hydrogen content are largely responsible for the superior waterproofing characteristics of the hydrogenated fish and marine oils. For example, in unhydrogenated whale oil, it is my understanding that there are present substantial amounts of glycerides of the highly unsaturated fatty acids, e. g., linoleic acid $C_{18}H_{32}O_2$ and clupanodonic acid $C_{22}H_{36}O_2$; and also glycerides of the less unsaturated or partially saturated fatty acids, such as oleic acid, $C_{18}H_{34}O_2$; and that in the hydrogenated whale oil, which I use, the glycerides of the corresponding saturated fatty acids are present in substantial amounts, namely, the glycerides of stearic acid $C_{18}H_{36}O_2$ and glycerides of behenic acid $C_{22}H_{44}O_2$, as well as glycerides of several of the hydroxy and partially saturated fatty acids. While I am not certain that these higher saturated fatty acid glycerides are mainly responsible for the superior properties of my composition, I believe from the tests that I have made that they have an important bearing thereon.

With respect to the water insoluble soaps, the selection depends for one thing upon the intended use of the waterproofing composition. For example, if a colorless composition is desired, the copper soaps would not be used on account of their green color. In such cases I have found aluminum stearate to act very efficiently. It is one of the most common of the water insoluble soaps and can be obtained economically in large quantities.

The solvents which are advantageously used likewise depend somewhat upon the intended use of the final composition. The use of these hydrocarbon solvents usually involves three problems, namely, odor, flashing point, and drying time. Where it is desired to produce a substantially odorless liquid composition, I prefer to use one of the hydrogenated naphthas, such as the one sold under the trade name of "Solvesso", which is a hydrogenated petroleum distillate having the following approximate characteristics: A. P. I. gravity, 34°; boiling range, 275°–365° F.; aniline point, −1; dimethyl sulphate value, 62; closed flash point, 61° F. If the odor is not as important as drying time, I prefer to use the hydrocarbon xylene since it dries rapidly. The comparatively low flash point of xylene, however, makes it undesirable for certain usages, and in those cases I use varsol (defined hereinabove) in addition to the xylene for the purpose of producing a higher flash point.

Among the dispersing agents that might be used, I find that the lower aliphatic alcohols are desirable. While any of the alcohols above mentioned will work satisfactorily, I have found it advantageous to use ethyl alcohol, either in its pure or denatured form.

Although both of the classes of natural and synthetic fats work satisfactorily, apparently due to their specific saturated fatty acid glyceride content, I prefer to use the synthetic or hydrogenated fats, since they can be easily and cheaply obtained, and although somewhat oleaginous they have sufficiently dry and pulverulent characteristics to render them easily handleable.

Three illustrative examples of the waterproofing composition characteristic of my invention are given below in terms of their respective materials and approximate proportions.

*Example 1*

| | Per cent |
|---|---|
| Water insoluble soap, e. g., aluminum stearate | 6 |
| Synthetic substantially saturated fatty acid glycerides, e. g., hydrogenated menhaden oil | 6 |
| Hydrocarbon solvents, e. g., xylene and varsol (defined hereinabove) | 87 |
| Aliphatic alcohol, e. g., ethyl alcohol | 1 |
| | 100 |

*Example 2*

| | Per cent |
|---|---|
| Water insoluble soap, e. g., aluminum stearate | 3 |
| Synthetic substantially solid saturated fatty acid glycerides, e. g., hydrogenated cotton seed oil | 4 |
| Hydrocarbon solvent, e. g., hydrogenated naphtha | 92 |
| Aliphatic alcohol, e. g., denatured ethyl alcohol | 1 |
| | 100 |

Example 3

| | Per cent |
|---|---|
| Water insoluble soap, e. g., aluminum stearate | 6 |
| Natural substantially solid saturated fatty acid glycerides, e. g., pure lard | 8 |
| Hydrocarbon solvent, e. g., hydrogenated naphtha | 85 |
| Aliphatic alcohol, e. g., amyl alcohol | 1 |
| | 100 |

I believe that the waterproofing composition of my invention, of which the above three samples are representative, is a true composition of matter. The several ingredients comprising this composition, when properly brought together, coact in such a manner that a product results having new and different characteristics of its own. The waterproofing efficiency of the resultant composition is not possessed by any one of its constituents taken individually nor is it characterized by a simple addition or accumulation of the individual waterproofing ability of each of the incorporated substances.

In my co-pending application, supra, I have described in detail the colloidal and gelatinous characteristics of aluminum stearate and the utilization of these characteristics in effecting coaction between the aluminum stearate and the hydrogenated fish oil. These characteristics of the aluminum stearate are likewise used to advantage in the present invention to effect intimate association of it with the substantially solid saturated fatty acid glycerides. The hydrocarbon solvents are used in the present invention to act as solvents or suspension media for the water insoluble soap and fatty acid glycerides. The alcoholic dispersing agent is used for the purpose of dispersing the colloidal aluminum stearate in such a manner that the resulting composition will remain in thin liquid form over a wide range of temperatures, and thereby permit easy and efficient application of the composition to various porous materials. The combined action of the hydrocarbon solvents and the alcoholic dispersing agent effects a highly penetrative form of solution, which is particularly advantageous in that it causes deep impregnation of the treated material and eliminates the formation of any thick surface coating thereon.

The saturated or partially saturated fatty acid glycerides, I have found, serve the useful dual purpose of increasing the waterproofing effectiveness of the water insoluble soaps, such as aluminum stearate, and at the same time overcome the natural tendency of these soaps to become dry and powdery upon long exposure, thus lengthening the useful life of the water insoluble soap and thereby the value and effectiveness of the waterproofing composition.

When my composition is applied to any porous material, the hydrocarbon suspension agents and the alcoholic dispersing agent evaporate fairly rapidly leaving on all surfaces that have been touched by the penetrating liquid a very thin, almost imperceptible, coating of the intimately associated water insoluble soap and fatty acid glycerides. This solid residue of metallic soap and glycerides may be purposely prepared by evaporation of the liquid constituents of the composition, and sold in such solid form as an article of commerce. Prior to its use this solid composition is redissolved or suspended in one of the suitable solvents such as those named hereinbefore.

The process of preparing the composition of the present invention may to advantage be carried out as follows: The water insoluble soap, e. g., aluminum stearate, is caused to gel in a coal tar hydrocarbon solvent, such as xylene, by heating a mixture of the two to approximately 180° F. This gel is then dispersed by the addition thereto of a small amount of alcoholic dispersing agent. To this hot dispersed colloidal type of solution is added a suitable amount of the substantially solid saturated fatty acid glycerides, preferably in ground or flake form. The glycerides dissolve in the hot solvent and coact with the colloidal aluminum stearate to form the new composition.

If desired, the composition may be prepared by simultaneously mixing all of the ingredients except the alcohol and heating the mixture to a temperature of approximately 180° F., at which point the mixture will become somewhat viscous. The alcohol is then added to disperse it and form the thin penetrative type of colloidal solution.

As a result of a number of tests, which I have made in preparing my composition, I find that the best waterproofing results are obtained when the aluminum stearate is so treated that it forms the heavy gel mentioned above, which gel is subsequently dispersed with alcohol. I have also found that this gel will not be formed when certain petroleum distillates, such as varsol, are used as the initial dissolving agent, nor when certain other substances, such as the fatty acid glycerides, are present. This gel is easily and effectively produced, however, when, as described above, the aluminum stearate is heated to the proper temperature in a coal tar distillate such as xylene.

It is to be understood that the doctrine of equivalents applies with full force and effect to the composition of matter disclosed in this application and that various modifications obvious to those skilled in the art may be made without departing from my invention, the scope of which is to be limited only by the appended claims.

What I claim as new is:

1. A liquid waterproofing composition of matter comprising a water insoluble soap, a normally substantially solid fatty acid glyceride, a hydrocarbon solvent, and a dispersing agent from the lower alcohols of the aliphatic series.

2. A liquid waterproofing composition of matter comprising a water insoluble soap, a natural substantially saturated fatty acid glyceride, a hydrocarbon solvent, and a dispersing agent selected from the lower aliphatic alcohols.

3. A penetrative liquid waterproofing composition of matter comprising a water insoluble soap, a synthetic normally solid fatty acid glyceride, a hydrocarbon solvent, and a dispersing agent selected from the lower aliphatic alcohols.

4. A liquid penetrative waterproofing composition of matter comprising a water insoluble soap, a natural fat composed predominantly of saturated and partially saturated glycerides of the higher fatty acids, a hydrocarbon solvent, and a lower aliphatic alcohol.

5. A liquid waterproofing composition of matter comprising a water insoluble soap, a hydrogenated fat composed predominantly of glycerides of the higher fatty acids, a hydrocarbon solvent, and an alcoholic dispersing agent selected from the lower alcohols of the aliphatic series.

6. A liquid waterproofing composition of matter comprising aluminum stearate, a hydrogenated fatty oil, a hydrocarbon solvent, and a lower aliphatic alcohol.

7. A liquid waterproofing composition of matter comprising aluminum stearate, a hydrogenated marine animal oil composed predominantly of glycerides of the higher saturated fatty acids, a hydrocarbon solvent, and an alcoholic dispersing agent selected from the lower alcohols of the aliphatic series.

8. A liquid waterproofing composition of matter comprising a water insoluble soap, a hydrogenated vegetable oil composed predominantly of glycerides of the higher saturated fatty acids, a hydrocarbon solvent, and a lower aliphatic alcohol.

9. A liquid waterproofing composition of matter comprising aluminum stearate, a saturated fatty acid glyceride solid at room temperatures, a hydrocarbon solvent, and a lower aliphatic alcohol.

10. A liquid waterproofing composition of matter comprising a water insoluble soap, a fatty material substantially solid at room temperature and composed principally of a mixture of saturated and nearly saturated fatty acid glycerides, a hydrocarbon solvent and a lower aliphatic alcohol.

11. A liquid waterproofing composition of matter comprising aluminum stearate, a fatty material containing substantial amounts of glycerides of stearic and behenic acids, a hydrocarbon solvent, and a lower aliphatic alcohol.

12. The method of preparing a liquid waterproofing composition of matter comprising heating a metallic fatty acid water insoluble soap in a coal tar distillate until said soap forms a heavy viscous gel-like mass, adding a relatively small quantity of an alcoholic dispersing agent selected from the lower alcohols of the aliphatic series to effect dispersion of said gel into a fluent liquid, and adding to this heated liquid an amount of a normally solid fatty acid glyceride, with agitation, whereby said water insoluble soap in colloidal condition and said glyceride are intimately associated.

13. The method of preparing a thin liquid waterproofing composition of matter comprising admixing a water insoluble soap, a hydrocarbon solvent and a substantially saturated fatty acid glyceride, heating this mixture until it becomes viscous, and adding to the viscous mixture a lower aliphatic alcohol to convert the mixture into a thin fluent liquid.

14. A liquid waterproofing composition of matter comprising a water insoluble metallic fatty acid soap, hydrogenated fish oil, at least one light hydrocarbon distillate, and a lower alcohol of the aliphatic series.

15. A waterproofing composition of matter comprising an intimate admixture of water insoluble metallic fatty acid soap and hydrogenated fish oil.

16. A waterproofing composition of matter comprising intimately associated water insoluble metallic fatty acid soap, and a compatible fatty hydrogenated oil adapted to coact with said water insoluble soap to form an intimate admixture therewith such that it acts to prevent said soap from assuming its naturally dry, powdery and non-adherent characteristics.

17. A liquid waterproofing composition of matter comprising a water insoluble soap, hydrogenated fish oil, a hydrocarbon solvent, and a lower alcohol of the aliphatic series.

18. A method of preparing a liquid waterproofing composition of matter comprising admixing a water insoluble soap with a hydrocarbon solvent, heating said mixture, adding a relatively small quantity of a lower aliphatic alcohol, and adding hydrogenated fish oil to said heated mixture.

19. A method of preparing a liquid water-proofing composition of matter comprising heating a mixture of water insoluble soap and hydrocarbon solvent until a gelatinous mass or gel is formed, then adding thereto a relatively small quantity of a lower aliphatic alcohol to effect dispersion of said gel into a thin colloidal type liquid, and adding thereto a hydrogenated fatty oil to coact with said water insoluble soap to form an intimate admixture therewith.

20. A transparent colloidal penetrative partially evaporable liquid waterproofing composition comprising a hydrocarbon solvent, a water insoluble soap, a hydrogenated fish oil and a lower aliphatic alcohol, in intimate admixture.

21. In a method of preparing a liquid waterproofing composition, the steps comprising heating a water insoluble soap in a hydrocarbon solvent until the mixture forms a gel or gelatinous mass and subsequently adding a normally substantially solid fatty acid glyceride.

22. In a method of preparing a liquid waterproofing composition, the steps comprising heating a water insoluble soap in a hydrocarbon solvent until the mixture forms a transparent gel and subsequently adding a substantially saturated fatty acid glyceride.

23. A method of preparing a liquid waterproofing composition comprising heating a water insoluble soap and a hydrocarbon solvent until the mixture forms a gel, adding a lower aliphatic alcohol to convert the gel into a thin colloidal dispersion, and adding thereto a normally substantially solid fatty acid glyceride.

24. A liquid waterproofing composition comprising a mobile colloidal dispersion of a water insoluble soap and hydrocarbon solvent intimately admixed with a normally substantially solid fatty acid glyceride dispersed in said solvent.

25. A liquid waterproofing composition comprising a mobile colloidal dispersion of a metallic fatty acid soap and a hydrocarbon solvent, intimately admixed with a normally solid fatty acid glyceride dissolved in said solvent.

26. In a method of preparing a liquid waterproofing composition of matter containing a water insoluble soap, a normally solid fatty acid glyceride, a hydrocarbon solvent, and a lower alcohol of the aliphatic series, the steps of heating said water insoluble soap in the hydrocarbon solvent until a substantially transparent gelatinous mass is formed and then adding thereto a relatively small quantity of the lower aliphatic alcohol to effect dispersion of said mass into a thin colloidal type of liquid.

27. In a method of preparing a liquid waterproofing composition of matter comprising heating a water insoluble soap and a hydrocarbon solvent until a gelatinous mass is formed and subsequently adding a normally solid fatty acid glyceride, the step which consists of adding a relatively small amount of a lower aliphatic alcohol to said gelatinous mass to effect dispersion thereof into a thin colloidal liquid.

28. A transparent colorless liquid waterproofing composition of matter comprising aluminum stearate, hydrogenated fish oil, a mixture of light hydrocarbon distillates, and a lower alcohol of the aliphatic series.

29. A transparent colorless liquid waterproofing composition of matter consisting of approximately 3% of aluminum stearate, 4% of hydrogenated fish oil, 92% light hydrocarbon solvents, and 1% alcoholic dispersing agent selected from the lower alcohols of the aliphatic series.

30. A liquid composition of matter for waterproofing porous materials comprising aluminum stearate, hydrogenated fish oil, light hydrocarbon solvents and ethyl alcohol incorporated in such manner that upon application of the composition to a porous material the liquid ingredients of the composition will cause deep penetration of the composition into the treated material and upon evaporation of the liquids there will result a tightly adherent residue consisting of the hydrogenated fish oil and aluminum stearate in intimate admixture with each other.

31. A colorless transparent thin liquid waterproofing composition comprising a colloidal dispersion of aluminum stearate intimately associated with hydrogenated fish oil in a liquid medium of light hydrocarbon solvents and an alcoholic dispersing agent selected from the lower alcohols of the aliphatic series.

32. The method of preparing a colloidal liquid waterproofing composition of matter comprising mixing aluminum stearate with a compatible light hydrocarbon solvent, heating said mixture sufficiently to form a substantially transparent viscous gel-like mass, adding a relatively small quantity of a lower aliphatic alcohol to this mass to cause dispersion of the mass into a fluent liquid, and adding to this hot liquid an amount of hydrogenated fish oil with agitation, whereby the hydrogenated fish oil and colloidal aluminum stearate are intimately associated.

33. The method of preparing a thin liquid colloidal composition of matter having waterproofing properties comprising admixing aluminum stearate, at least one light hydrocarbon distillate and hydrogenated fish oil, heating this mixture until it becomes viscous, and adding to the viscous mixture an alcoholic dispersing agent selected from the lower alcohols of the aliphatic series to convert the mixture into a thin fluent colloidal type of liquid.

34. A waterproofing composition of matter comprising a mixture of intimately associated aluminum stearate and hydrogenated fish oil.

JOHN HERMAN GARDTHAUSEN.